(12) United States Patent
Krishnamurthy et al.

(10) Patent No.: US 8,601,591 B2
(45) Date of Patent: Dec. 3, 2013

(54) METHOD AND APPARATUS FOR PROVIDING WEB PRIVACY

(75) Inventors: Balachander Krishnamurthy, New York, NY (US); Craig Wills, Acton, MA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 330 days.

(21) Appl. No.: 12/569,491

(22) Filed: Sep. 29, 2009

(65) Prior Publication Data

US 2010/0199356 A1 Aug. 5, 2010

Related U.S. Application Data

(60) Provisional application No. 61/150,227, filed on Feb. 5, 2009.

(51) Int. Cl.
*G06F 21/00* (2013.01)
(52) U.S. Cl.
USPC ............................................. 726/26; 713/182

(58) Field of Classification Search
None
See application file for complete search history.

(56) References Cited

U.S. PATENT DOCUMENTS

| | | | | |
|---|---|---|---|---|
| 7,530,099 | B2 * | 5/2009 | Flurry et al. | 726/8 |
| 7,886,000 | B1 * | 2/2011 | Polis et al. | 709/203 |
| 8,209,549 | B1 * | 6/2012 | Bain, III | 713/193 |
| 2005/0240490 | A1 * | 10/2005 | Mackey | 705/26 |
| 2007/0150603 | A1 * | 6/2007 | Crull et al. | 709/227 |
| 2007/0255952 | A1 * | 11/2007 | Zhou | 713/168 |
| 2009/0044020 | A1 * | 2/2009 | Laidlaw et al. | 713/176 |
| 2009/0228780 | A1 * | 9/2009 | McGeehan | 715/234 |

\* cited by examiner

*Primary Examiner* — Fikremariam A Yalew

(57) ABSTRACT

A method and an apparatus for providing privacy in a network are disclosed. For example, the method receives a request, e.g., an HTTP request, from a user for information, wherein the information includes at least a Uniform Resource Locator (URL) of at least an aggregator. The method identifies all personally identifiable information of the user. The method then masks the personally identifiable information from the browser in the endpoint device of the user, while responding to the request.

17 Claims, 3 Drawing Sheets

METHOD AND APPARATUS FOR PROVIDING WEB PRIVACY

This application claims the benefit of U.S. Provisional Application No. 61/150,227 filed on Feb. 5, 2009, which is herein incorporated by reference.

The present disclosure relates generally to communication networks and, more particularly, to a method and apparatus for providing web privacy in a network, e.g., a packet network or an Internet Protocol (IP) network.

BACKGROUND

The proliferation of Online Social Networks (OSNs) has enabled users to interact with others of similar interest over a network, e.g., the Internet. It is not unusual that a user may visit OSN and non-OSN websites. However, the user's browser may be asked to visit an aggregator. An aggregator is a third-party Web server that tracks user activity across various (OSN and non-OSN) first-party sites to create a behavioral profile. During that visit to an aggregator, information about the user is handed to the aggregator along with the aggregator's tracking cookie. The same tracking cookie is also sent to the aggregator when the user visited (or will visit) the non-OSN website. Thus, the aggregator is able to link the information that it received from the OSN site due to leakage of user's personal information with the tracking cookie already in its possession. Such linkage enables the aggregator to identify the user who visited the non-OSN site. Therefore, the aggregator will be able to determine the identity of the user who visited the non-OSN site as well as OSN site.

SUMMARY

In one embodiment, the present disclosure discloses a method and apparatus for providing privacy in a network. For example, the method receives a request from a browser in a user endpoint device of a user for information, wherein the information includes at least a Uniform Resource Locator (URL) of at least an aggregator. The method identifies personally identifiable information of the user. The method then masks the personally identifiable information from the browser in the endpoint device of the user, while responding to the request.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for providing web privacy in a network. Although the present disclosure is discussed below in the context of a Multimedia Subsystem Network (IMS), the present disclosure is not so limited. Namely, the present disclosure can be applied to other packet networks, e.g., wireless networks, Voice over Internet Protocol (VoIP) networks, and the like.

The proliferation of Online Social Networks (OSNs) has enabled users to interact with others of similar interest. For example, in order to become a member and successfully find other users of similar interest, users often provide the OSN with personal information about themselves. For example, a user may provide his or her name, address, age, gender, interests, username, and so on. Most users believe the information that they provided is accessible only within the OSN environment and are typically shared only among a limited set of users of similar interest. However, the personal information may leak from the OSN to third parties, e.g., aggregators.

Figure 1:
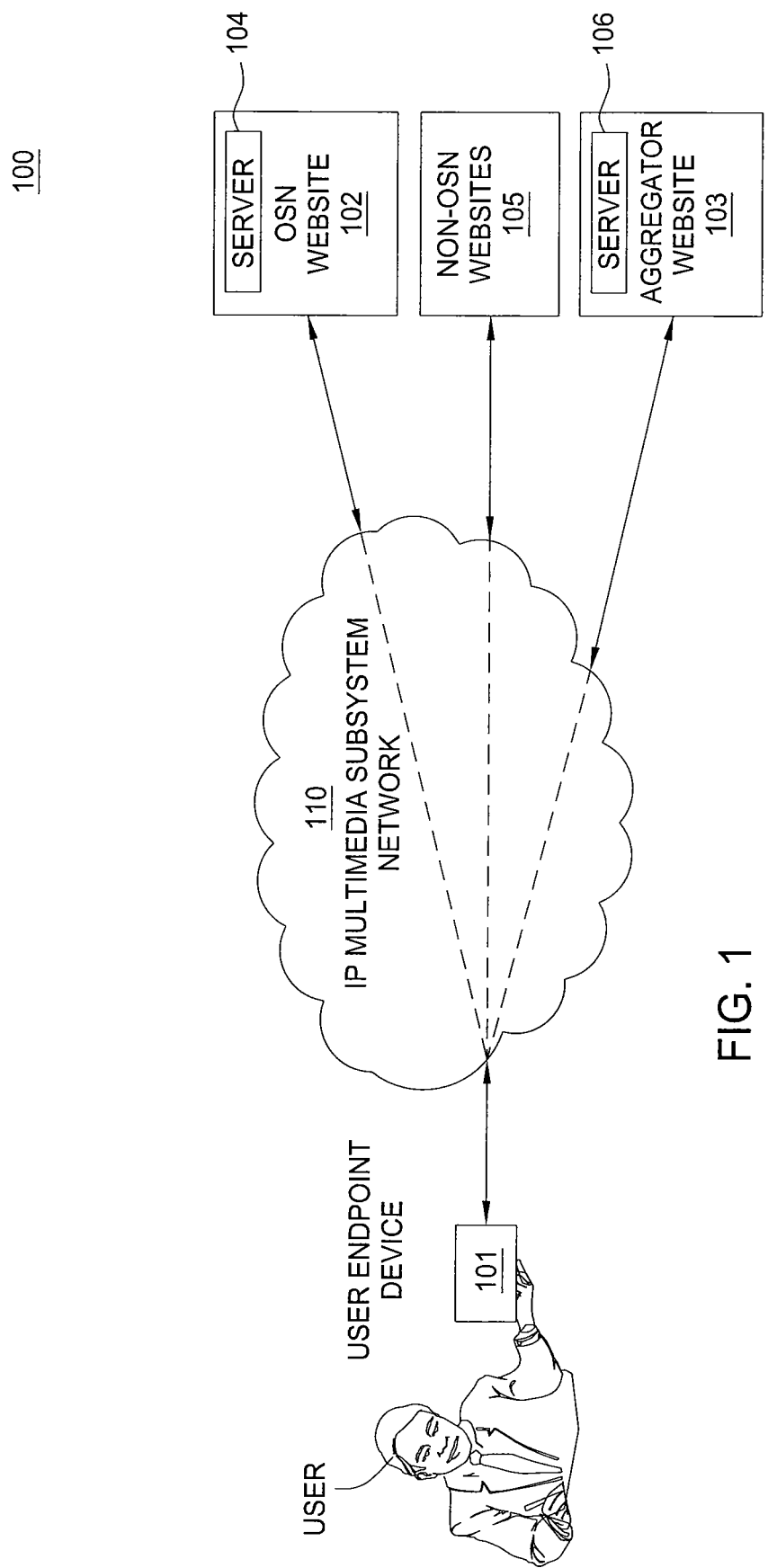
FIG. 1 illustrates an exemplary network with one embodiment of the present disclosure for providing web privacy in a network.

To better understand the current disclosure, FIG. 1 illustrates an exemplary network 100 related to the current disclosure. In one embodiment, the exemplary network 100 comprises a User Endpoint (UE) device 101 accessing a website 102 via an Internet Protocol (IP) multimedia subsystem network 110. The IP Multimedia Subsystem (IMS) network 110 may be a Voice over Internet Protocol (VoIP) network, and the like. In one embodiment, the website 102 (having a server 104) is an OSN website. It should be noted that although only one website is illustrated, the present disclosure is not so limited. A user of a social network may access the OSN website 102 via the UE 101 (e.g., a computer, a laptop, a mobile phone, a personal digital assistant (PDA) and the like) and the IMS 110. However, the OSN 102 may allow information pertaining to the user, e.g., internal identification of the user, name, address, age, gender, interests, username, etc., to be accessible to a browser in the user's endpoint device. In turn, the browser may populate a Referer field value of a Referer header with the information pertaining to the user while visiting a third party aggregator website. It should be noted that although the present disclosure is discussed in the context of a Referer header, the present disclosure is not so limited. In other words, the personal information may be leaked by the browser of the user via other mechanisms, or more broadly, by any user applications that may interact with the OSN 102.

In one example, the leakage of the personal information may occur due to the visibility of the OSN user identification to the browser. For example, when the user interacts with the OSN server, the user enters the user's identification (e.g., userid) for accessing the social network. In addition to loading the content for the OSN, the browser may retrieve one or more objects from a third party server. That is, external third party websites may be automatically accessed as a result of the accessing actions within the OSN. For example, the browser may retrieve advertisements (ads) from a third party aggregator sites as part of presenting a webpage of the OSN to the user. For the example above, when a user accesses the OSN website 102 for the purpose of social networking, links associated with an aggregator website 103 may be embedded in the responses received from the OSN website 102 by the UE 101. The browser in UE 101 may then use the link to load content from the aggregator website 103. For example, the browser in the UE 101 may send a request to the aggregator 103 that includes a Referer header in the Hyper-Text Transfer Protocol (HTTP) request. The Referer header construction is handled by the browser. Hence, the OSN server of website 102 does not have control over the Referer header construction. The browser may populate the Referer header with information pertaining to the user obtained from the OSN. Furthermore, it should be noted that an aggregator is capable of gathering data without presenting advertisements to the user. The above description in the context of presenting an advertisement is only illustrative.

In one example, the browser in the UE 101 may include an HTTP Referer header indicating a Uniform Resource Identifier (URI) of a webpage that the user was visiting, which in this case is the OSN website 102. That is, the OSN user identification may be visible to the browser in UE 101. The browser in UE 101 may then include the OSN user identification in the Referer header while loading content from the aggregator server 106 of website 103. The aggregator server 106 may use the user identification and cookies to track the user's actions across various websites. That is, the aggregator server is able to link information obtained using the cookies with the personally identifiable information now made accessible by the browser (via the value in the Referer header). It should be noted that the personally identifiable information may not be directly stored in the Referer header itself. That is, the Referer header may simply contain a pointer to the personally identifiable information, e.g., an internal URL within the OSN website. It should be further noted that the user may interact with many other non-OSN websites 105. However, once the aggregator is able to link the personally identifiable information to the user, the aggregator will be able to track the user's actions across these other non-OSN websites 105.

To illustrate, Table-1 below provides an exemplary request with leakage of the userid. The userid (example1userid) is passed along to the aggregator (e.g., doubleclick.net) via the Referer field.

TABLE 1

| userid=example1userid |
| --- |
| > Example request headers (userid= example1userid):<br>> GET<br>> /clk;202030889;26620264;z;u=ds&sv1=170958623&sv2=200902111&sv3=83115; %<br>> 3fhttp://www.ftd.com/14935/catalog/category.epl?index_id=product_flowers<br>> _specialvalues_valentinesday&parent_index=product_flowers_specialvalues<br>> &external=14935&campaign_id=facebook HTTP/1.1<br>> Host: ad.doubleclick.net<br>> Referer: http://www.facebook.com/profile.php?id= example1userid<br>&ref=name<br>> Cookie: id=200000015bdfb9ec\|lt=1234359834\|et=730\|cs=7bdpmsks |

In one example, a user's action within the OSN may result in the OSN userid being sent to a third party analytics site via a Uniform Resource Locator (URL). The analytics site may then associate the analytics data with the OSN userid. The analytics site may not employ a cookie. To illustrate, Table-2 provides an exemplary request with the userid being made available to an analytics site. The userid (e.g., example2userid) is obtained by the analytics site google-analytics.com.

TABLE 2

| userid= example2userid |
| --- |
| > GET<br>> /_utm.gif?utmwv=4.3&utmn=775335957&utmhn=twitter.com&utmcs=UTF-8&utms<br>> r=1280x1024&utmsc=32-bit&utmul=en-us&utmje=1&utmfl=-&utmdt=Twitter%20%<br>> 2F%20example2userid<br>&utmhid=1719587817&utmr=0&utmp=/profile/example2userid&utmac=UA<br>> -30775-6&utmcc=_utma%3D43838368.1807531165999216600.1234362971.1234362971.<br>> 1234362971.1%3B%2B_utmz%3D43838368.1234362971.1.1.utmcsr%3D(direct)<br>> %7Cutmccn%3D(direct)%7Cutmcmd%3D(none)%3B%2B_utmv%3D43838368.lang%<br>> 253A%2520en_US%3B%2B_utmx%3D43838368.00002859631981918557%3A1%3A6%3B<br>> HTTP/1.1<br>> Host: www.google-analytics.com<br>> Referer: http://twitter.com/example2userid |

In one example, a user's action with the OSN may result in information retrieval from a server that appears to be part of the OSN. However, an examination of the authoritative Domain Name Server (DNS) indicates that the server actually belongs to a third party aggregator. To illustrate, Table-3 provides an exemplary request that results in information retrieval from a server that appears to be part of the OSN. Specifically, ad.hi5.com belongs to yieldmanager.com. It should be noted that ad.hi5.com is part of yieldmanager.com based on Domain Name System (DNS) records showing that yieldmanager.com, and not hi5.com, is the authoritative name server for ad.hi5.com. The userid (e.g., example3userid) is obtained by the third party aggregator yieldmanager.com.

TABLE 3

| userid= example3userid |
|---|
| > |
| > # ad.hi5.com belongs to yieldmanager.com GET |
| > /st?ad_type=iframe&ad_size=300×250&section=435151&age=29&gender=M |
| > HTTP/1.1 |
| > Host: ad.hi5.com |
| > Referer: |
| > http://www.hi5.com/friend/profile/displaySameProfile.do?userid= example3userid |
| > Cookie: JSESSIONID=aU2OAatS0ig-; _qca=1234363470-17363624-59919420; _qcb=536823274; _utma=107741979.4337105716337640000.1234543902.1234543902. 1234543902.1; _utmb=107741979.0.10.1234543902; _utmc=107741979; _utmz=107741979.1234543902.1.1.utmcsr=(direct)\|utmccn=(direct)\|utmcmd=(none); LoginInfo=M_AD_MI_MS\|US_0_11201; LocaleCookie=en_US; Email=example2userid@yahoo.com; importerInt=true; hi5nsc=01111; fcHistory=275:1234630314964:611:1234630339487:678:1234630339488: 770:1234630339494:678:1234630406072:769:1234630406078; wlemail=example2userid@yahoo.com; wlresponse=false; Userid=example3userid; AL=1:qEQCqkKBaoStW9drSN23Xg..:BU7vlwjy9Obs_i938h_Dg_F8Xzf3GZ-ewNYTIApx7A. |

In one example, a user's action with the OSN may cause the information about a user (e.g., age, gender, etc.) to be sent to a third party aggregator. The third party aggregator may have its own cookies. The user information may be sent as part of the URL or explicitly. To illustrate, Table-4 provides an exemplary request that results with leakage of user information. The userid (e.g., example2userid) may not be leaked to the third party aggregator, e.g. yeildmanager.com. However, the user's age and gender are leaked.

TABLE 4

| userid= example2userid |
|---|
| GET |
| > /imp?Z=300×250&age=29&gender=M&s=435149&_salt=1748264823&B=12&m=2&u=http |
| > %3A%2F%2Fwww.hi5.com%2Ffriend%2FdisplayLoggedinHome.do&r=0 HTTP/1.1 |
| > Host: ad.yieldmanager.com |
| > Referer: |
| > http://ad.hi5.com/st?ad_type=iframe&ad_size=300×250&section=435149&age= |
| > 29&gender=M |
| > Cookie: |
| > uid=uid=05d651a4-f842-11dd-8ef3-001e6849f3f3&_hmacv=1&_salt=1901887600 |
| > &_keyid=kl&_hmac=3d76f5993c101ecb172f67daa02286f3cb26c343; |
| > bh="b!!!!$!!Kut!!!!#:[8.B!!N=h!!!!(: [8//"; |
| > ih="b!!!!%!$<7E!!!!#:[8.C!$h^x!!!!$:[8.U!$o]>!!!!#:[8.I"; |
| > vuday1=D3zz?N0mR8S*-p); liday1=p0g'!#2qZ2N0mR8SKNMA |

The above examples illustrate various ways in which the user's personal information is obtained by a third party aggregator. It should be noted that these examples are only illustrative and are not intended to be exhaustive as to how a user's personal information is obtained by a third party aggregator without the knowledge of the user. Such leakage may be dangerous. For example, the third party aggregator may track personal information, e.g., from various websites visited by a user, using cookies. The point is that as a result of the OSN user ID information leakage and the aggregator's ability to combine this information with information that the aggregator may have already collected via cookies, the user's personal information becomes available to the third party aggregator. That is, the third party aggregator website may amass information from various websites that the user has visited and will visit in the future. In turn, the aggregator is now able to associate the personal information with each of the visited websites. If such user information is used in a malicious or inappropriate manner or made available to unauthorized users, a user's privacy will be breached, at minimum, and may even potentially lead to greater harm, such as potential compromise of the user's personal information in other contexts such as on-line banking, on-line purchasing and so on. Thus, the leakage of user information to aggregators is clearly dangerous.

In one embodiment, the current disclosure provides web privacy by preventing such leakage of personal information and denying the ability of third party aggregators from associating personal information of a user with the user's movement(s) around the Internet. In one embodiment, the method provides web privacy by masking the personal (private) information (e.g., a name, a street address, an age, a gender, interests of the user, a username, a user identification, a location, activities of the user's friends, a birth year, school names, an employer of the user, a birthday, a zip code, an email address, a phone number, photos, a photo album, etc.) unavailable to the browser in the user's endpoint device. For example, the OSN may receive a request from a user, e.g., an HTTP request. The OSN may identify the personal information of the user prior to responding to the HTTP request. For example, the OSN may identify the userid for accessing the OSN as personally identifiable information for the user. The OSN may then mask the personally identifiable information (in this case the userid) from the browser while responding to the HTTP request. For example, the masking of the personally identifiable information is to break any potential connection between the information presented to the browser and the actual userid.

For the example in FIG. 1, the OSN website 102 may receive a request for information from the user endpoint device 101. The OSN website 102 may then identify the personal information (e.g., userid) before replying to the requested information. The OSN website may then reply to the request while masking the personal information (e.g. userid) from the browser. That is, the OSN provides a response to the user endpoint device without any personal information that can be used to link with information collected via cookies or to identify the user, e.g., name, address, age, gender, interests, username, user identification, etc. The aggregator server is then unable to receive the personally identifiable information and is thus unable to associate such information with data the aggregator collects using cookies.

One way to look at the present disclosure is that the personally identifiable information or pointers to the personally identifiable information are not intended to be shared with any third parties, except with the user. Thus, it is important that the OSN provides a mechanism to minimize the possibility of accidental leakage of personal information of the user, e.g., accidental leakage to the browser via the Referer header value.

In one embodiment, the method prevents leakage of the personally identifiable information by maintaining an internal hash table of the user identification and including a dynamically generated opaque string in responses to the browser, wherein the dynamically generated opaque string serves as a temporary identification to the browser. The opaque string may be included in the Referer header by the browser. However, no personally identifiable information is leaked as the aggregator site will not be able to use the opaque string to refer to the personally identifiable information (e.g., name, address, age, gender, interests, username, user identification, etc.). Moreover, since the opaque string is temporary and arbitrarily chosen, the user is assigned a new opaque string either for every OSN session or for every request within a session, making any association by the aggregator meaningless.

In one embodiment, the method employed in the OSN may present a fake identification to the browser. For the example above, the actual userid may be example2userid. However, the OSN may send a fake identification, e.g., userid=xyxyxyxy. Depending on the implementation, the fake identification may or may not be temporary. For example, the OSN may keep a record of fake identifications used for communicating with a specific user and reuse the same fake identification for future sessions. In another example, the OSN may provide a new fake identification for each OSN session or each request within a session. Since the actual userid is kept only within the OSN, the third party aggregator is unable to exploit it for making meaningful connections to other collected data.

In one embodiment, the method may provide web privacy as an optional feature. For example, the OSN may query the user whether a web privacy service or safeguard is desired when the user logs on for social networking. The user may then provide a preference to the OSN. If the user opts to receive the web privacy service, then the OSN may then communicate with the user endpoint device by implementing one or more of the above embodiments of the current disclosure.

In one embodiment, the method may provide web privacy with an opt-out feature. For example, the OSN may provide the web privacy service or feature to all users and enable users to opt-out if the users prefer that their personally identifiable information not be replaced by temporary or fake information.

In one embodiment, the method may provide web privacy as a service. For example, the OSN service provider may enable a user to subscribe to an OSN membership with an option to receive web privacy feature as a service. In one embodiment, the OSN service provider may provide the web privacy as a service for a fee, e.g., a one-time membership fee, a recurrent fee, e.g., a monthly fee, and so on.

It should be noted that although the present disclosure is described above for OSNs, it is possible that similar leakage may be occurring in non-OSN websites in interacting with the browsers of users. Hence, the current method may be applied to other websites that have personal information of users.

Figure 2:
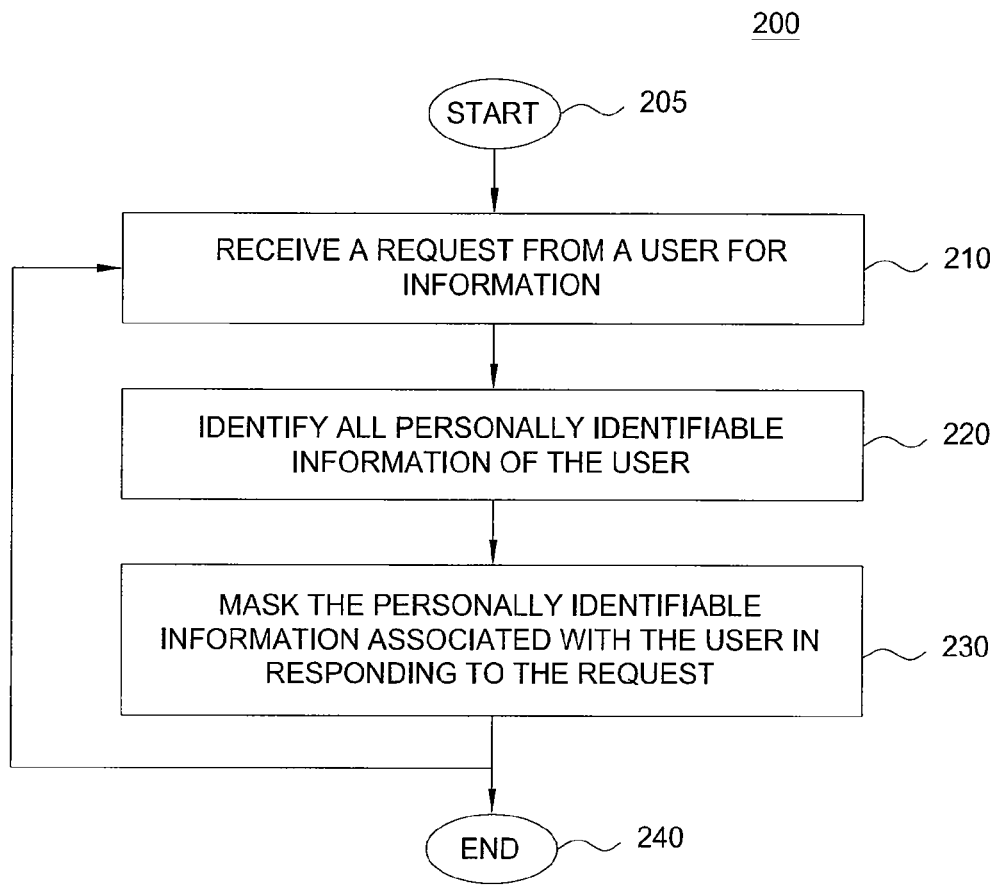
FIG. 2 illustrates a flowchart of a method for providing web privacy in a network.

FIG. 2 illustrates a flowchart of a method 200 for providing web privacy. For example, the current method may be implemented by an application server, e.g., deployed in an OSN for providing privacy to users of an OSN website. Method 200 starts in step 205 and proceeds to step 210.

In step 210, method 200 receives a request, e.g., an HTTP request, from a user for information, wherein the information includes at least a Uniform Resource Locator (URL) of at least an aggregator. For example, a website, e.g., an OSN website, may receive an HTTP request from a browser of a user endpoint device.

In step 220, method 200 identifies all personally identifiable information of the user. In one embodiment, the personally identifiable information may comprise one or more of: a name, a street address, an age, a gender, interests of the user, a username, a user identification, a location, activities of the user's friends, a birth year, school names, an employer of the user, a birthday, a zip code, an email address, a phone number, photos, a photo album, etc. For example, the OSN may identify an internal identification of the user (e.g., userid for accessing the OSN) so that the internal identification can be omitted or kept away in a response to the user. It should be noted that the above list of personally identifiable information is only illustrative and not exhaustive.

In step 230, method 200 masks the personally identifiable information from the browser deployed in the endpoint device of the user in a manner that minimizes leakage of the personally identifiable information, while responding to the request. For example, the OSN may respond to the HTTP request without providing the browser access to the personally identifiable information associated with the user, e.g., such as the userid for accessing the OSN. It should be noted that the manner with which the OSN prevents access to the personally identifiable information from the browser can be tailored to minimize the accidental leakage the personally identifiable information, e.g., omitting or disguising the personally identifiable information when it is to be used in the HTTP header, while providing access to the personally identifiable information when it is to be used in the payload. The method may then either return to step 210 to continue receiving more requests or to step 240 to end the method.

For example, the exemplary request in Table-1 may be modified such that the userid (e.g., example1userid) is no longer visible or accessible to the browser. The browser is then unable to populate the Referer header with the personally identifiable information while loading content from an aggregator (e.g., doubleclick.net). Table-5 shows the modified response from the OSN without the userid.

TABLE 5 userid=example1userid

> Example request headers (userid= ):
> GET
> /clk;202030889;26620264;z;u=ds&sv1=170958623&sv2=200902111&sv3=83115;%
> 3fhttp://www.ftd.com/14935/catalog/category.epl?index_id=product_flowers
> _specialvalues_valentinesday&parent_index=product_flowers_specialvalues
> &external=14935&campaign_id=facebook HTTP/1.1
> Host: ad.doubleclick.net
> Referer: http://www.facebook.com/profile.php?id= &ref= name
> Cookie: id=200000015bdfb9ec||t=1234359834|et=730|cs=7bdpmsks In one embodiment, the method may also present to the browser of the user endpoint device, a dynamically generated opaque string that serves as a temporary identification. For example, the method may generate an opaque string that may be presented to the browser in the user's endpoint device instead of the actual userid. For example, instead of the userid being simply removed, the userid may be replaced by a temporary identification. Thus, from the perspective of the third party, it believes that it has obtained the identification of the user.

In one embodiment, the method may also present to the browser of the user endpoint device a fake identification. For example, the method may assign a fake identification to the user and provide the fake identification to the browser. The fake identification may be used for other sessions. Again, from the perspective of the third party, it believes that it has obtained the identification of the user.

In one embodiment, the method may provide the web privacy with an opt-out feature. For example, the method may enable an OSN user to access the social network with an option to opt-out of a web privacy feature. If the user does not opt-out, then the user is then automatically provided with web privacy by removing the user's personally identifiable information.

In one embodiment, the method may provide the web privacy as an optional feature of a service. For example, the method may enable an OSN service user to access the social network with an optional feature to receive web privacy while interacting with the OSN. If the user subscribes to the optional feature for a fee, the method then provides privacy to the OSN user via one or more of the above described embodiments. Otherwise, the method enables the user to access the social network via a normal process.

It should be noted that although not specifically specified, one or more steps of method 200 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 2 that recite a determining operation or involve a decision, do not necessarily require that both branches of the determining operation be practiced. In other words, one of the branches of the determining operation can be deemed as an optional step.

Figure 3:
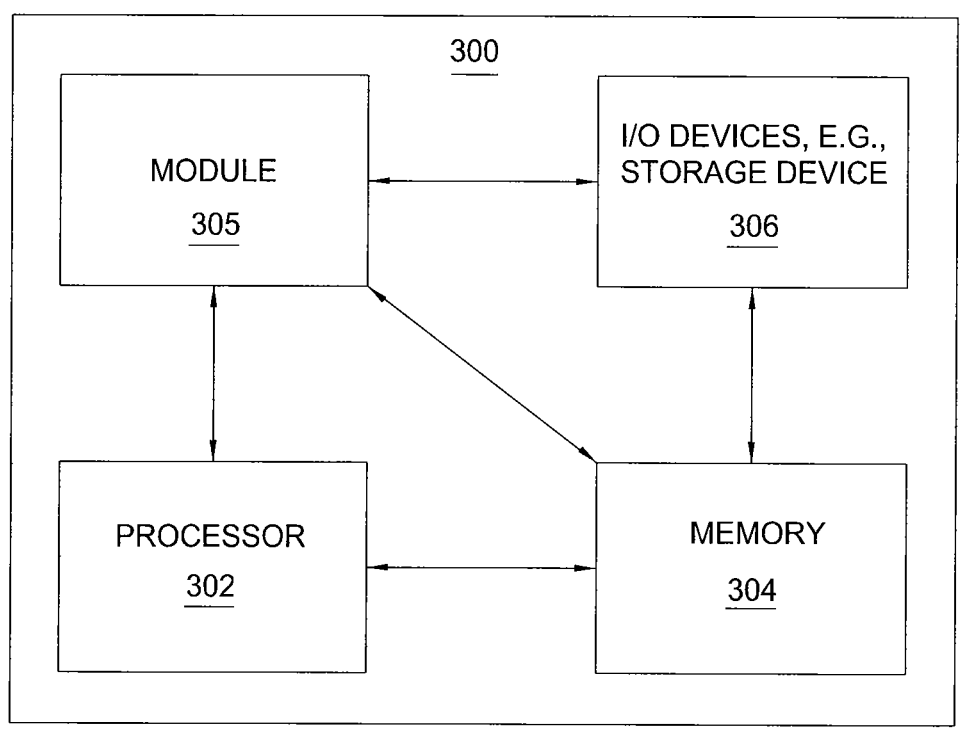
FIG. 3 illustrates a high-level block diagram of a general-purpose computer suitable for use in performing the functions described herein.

FIG. 3 depicts a high-level block diagram of a general-purpose computer or server suitable for use in performing the functions described herein. As depicted in FIG. 3, the system 300 comprises a processor element 302 (e.g., a CPU), a memory 304, e.g., random access memory (RAM) and/or read only memory (ROM), a module 305 for providing web privacy, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present disclosure can be implemented in software and/or in a combination of software and hardware, e.g., using application specific integrated circuits (ASIC), a general-purpose computer or any other hardware equivalents. In one embodiment, the present module or process 305 for providing web privacy can be loaded into memory 304 and executed by processor 302 to implement the functions as discussed above. As such, the present method 305 for providing web privacy (including associated data structures) of the present disclosure can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for masking personally identifiable information in a network, comprising:

receiving, by a processor, a request from a browser in a user endpoint device of a user for information, wherein the information includes a uniform resource location of an aggregator;

identifying, by the processor, the personally identifiable information of the user;

masking, by the processor, the personally identifiable information from being received by the browser in the endpoint device of the user, while responding to the request, wherein the masking of the personally identifiable information does not provide the personally identifiable information in responding to the request; and presenting, by the processor, to the user endpoint device a dynamically generated opaque string that serves as a temporary identification, wherein the opaque string is included in a referer header, wherein the opaque string is temporarily assigned to the user.

2. The method of claim 1, further comprising:

wherein the opaque string comprises a fake identification.

3. The method of claim 1, wherein the personally identifiable information comprises a selection from: a name, a street address, an age, a gender, an interest of the user, a username, a user identification, a location, an activity of a friend of the user, a birth year, a school name, an employer of the user, a birthday, a zip code, an email address, a phone number, a photo, and a photo album.

4. The method of claim 1, wherein the request is received via a website having access to the personally identifiable information of the user.

5. The method of claim 4, wherein the website is operated by an online social network.

6. The method of claim 1, wherein the providing privacy is an optional feature of a service of the network.

7. A non-transitory computer-readable medium storing a plurality of instructions which, when executed by a processor, cause the processor to perform operations for masking personally identifiable information in a network, the operations comprising:
   receiving a request from a browser in a user endpoint device of a user for information, wherein the information includes a uniform resource location of an aggregator;
   identifying the personally identifiable information of the user;
   masking the personally identifiable information from being received by the browser in the endpoint device of the user, while responding to the request, wherein the masking of the personally identifiable information does not provide the personally identifiable information in responding to the request; and
   presenting the user endpoint device a dynamically generated opaque string that serves as a temporary identification, wherein the opaque string is included in a referer header, wherein the opaque string is temporarily assigned to the user.

8. The non-transitory computer-readable medium of claim 7, further comprising:
   wherein the opaque string comprises a fake identification.

9. The non-transitory computer-readable medium of claim 7, wherein the personally identifiable information comprises a selection from: a name, a street address, an age, a gender, an interest of the user, a username, a user identification, a location, an activity of a friend of the user, a birth year, a school name, an employer of the user, a birthday, a zip code, an email address, a phone number, a photo, and a photo album.

10. The non-transitory computer-readable medium of claim 7, wherein the request is received via a website having access to the personally identifiable information of the user.

11. The non-transitory computer-readable medium of claim 10, wherein the website is operated by an online social network.

12. The non-transitory computer-readable medium of claim 7, wherein the providing privacy is an optional feature of a service of the network.

13. An apparatus for masking personally identifiable information in a network, comprising:
   a processor; and
   a non-transitory computer-readable medium storing a plurality of instructions which, when executed by the processor, cause the processor to perform operations, the operations comprising:
   receiving a request from a browser in a user endpoint device of a user for information, wherein the information includes a uniform resource location of an aggregator;
   identifying the personally identifiable information of the user;
   masking the personally identifiable information from being received by the browser in the endpoint device of the user, while responding to the request, wherein the masking of the personally identifiable information does not provide the personally identifiable information in responding to the request; and
   presenting to the user endpoint device dynamically generated opaque string that serves as a temporary identification, wherein the opaque string is included in a referer header, wherein the opaque string is temporarily assigned to the user.

14. The apparatus of claim 13, further comprising:
   wherein the opaque string comprises a fake identification.

15. The apparatus of claim 13, wherein the personally identifiable information comprises a selection from: a name, a street address, an age, a gender, an interest of the user, a username, a user identification, a location, an activity of a friend of the user, a birth year, a school name, an employer of the user, a birthday, a zip code, an email address, a phone number, a photo, and a photo album.

16. The apparatus of claim 13, wherein the request is received via a website having access to the personally identifiable information of the user.

17. The apparatus of claim 16, wherein the website is operated by an online social network.

* * * * *